(12) United States Patent
Roy et al.

(10) Patent No.: US 7,190,719 B2
(45) Date of Patent: Mar. 13, 2007

(54) IMPEDANCE CONTROLLED TRANSMITTER WITH ADAPTIVE COMPENSATION FOR CHIP-TO-CHIP COMMUNICATION

(75) Inventors: Aninda K. Roy, San Jose, CA (US); Claude R. Gauthier, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 761 days.

(21) Appl. No.: 10/338,360

(22) Filed: Jan. 8, 2003

(65) Prior Publication Data

US 2004/0131128 A1    Jul. 8, 2004

(51) Int. Cl.
*H03H 7/30* (2006.01)
(52) U.S. Cl. ..................................... 375/229
(58) Field of Classification Search ........ 375/229–236, 375/295–315; 327/108
See application file for complete search history.

(56) References Cited

U.S. PATENT DOCUMENTS

| | | | |
|---|---|---|---|
| 5,959,472 A * | 9/1999 | Nagamatsu et al. | 327/108 |
| 6,100,735 A * | 8/2000 | Lu | 327/158 |
| 6,452,428 B1 * | 9/2002 | Mooney et al. | 327/108 |
| 6,539,072 B1 * | 3/2003 | Donnelly et al. | 375/371 |
| 6,570,406 B2 * | 5/2003 | Tang et al. | 326/86 |
| 6,605,969 B2 * | 8/2003 | Mikhalev et al. | 327/158 |
| 6,772,250 B2 * | 8/2004 | Dreps et al. | 710/100 |
| 2002/0021150 A1 * | 2/2002 | Tuchiya et al. | 327/108 |
| 2002/0070765 A1 * | 6/2002 | Tsujikawa | 327/66 |
| 2002/0149402 A1 * | 10/2002 | Martin et al. | 327/108 |

* cited by examiner

*Primary Examiner*—Chieh M. Fan
*Assistant Examiner*—Jason M. Perilla
(74) *Attorney, Agent, or Firm*—Osha Liang LLP

(57) ABSTRACT

A method and apparatus for adjusting a frequency characteristic of a signal is provided. A transmitter circuit uses a driver circuit and a filter to generate the signal. The frequency characteristic of the signal is adjusted, or "equalized," using a replica driver that adjusts the driver circuit and a voltage control circuit that adjusts the filter.

13 Claims, 11 Drawing Sheets

IMPEDANCE CONTROLLED TRANSMITTER WITH ADAPTIVE COMPENSATION FOR CHIP-TO-CHIP COMMUNICATION

BACKGROUND OF INVENTION

As the frequencies of modern computers continue to increase, the need to rapidly transmit data between chip interfaces also increases. To accurately receive data, source synchronous transmission may be used in which a clock signal is transmitted to help recover the data. The clock signal determines when a data signal should be sampled by a receiver's circuits.

The clock signal may transition at the beginning of the time the data signal is valid. The receiver often requires, however, that the clock signal transition during the middle of the time that the data signal is valid. Also, the transmission of the clock signal may degrade as it travels from its transmission source. In both circumstances, a delay locked loop, or DLL, can regenerate a copy of the clock signal at a fixed phase offset from the original clock signal.

FIG. 1 shows a typical source synchronous communication system (100). A data signal is transmitted from circuit A (12) to circuit B (34) on a data path (18). The data signal is generated by a logic circuit (14) and output by a transmitter circuit (16) on the circuit A (12). To aid in the recovery of the transmitted data signal, a clock signal is transmitted on a clock path (20) at a similar time as the data signal. Although not shown, the communication system (100) could also have a path to transmit a data signal from circuit B (34) to circuit A (12) along with an additional clock signal (not shown).

In FIG. 1, a DLL (40) generates a copy of the clock signal from the clock path (20) with a valid state and with a phase offset to be used by other circuits. For example, the DLL (40) outputs the copy of the clock signal with a predetermined phase offset to cause a latch device to sample the data signal. A latch device may be, for example, a flip-flop (38) as shown in FIG. 1. When the copy of the clock signal transitions, the flip-flop (38) samples the output of an amplifier (36) that amplifies the data signal on the data path (18). The latched signal from the flip-flop (38) is provided to other circuits on circuit B (34) as a local data signal (42).

As shown in FIG. 2, a path, i.e., the data path (18) and the clock path (20) shown in FIG. 1, has a frequency characteristic (202) that attenuates a signal dependent on a frequency of the signal. As a frequency content of a signal increases, the attenuation of the path increases. Typically, channel equalization is used to "equalize" the frequency characteristic (202) of the path. Basically, a receiver circuit will use an inverse frequency characteristic (204) to equalize the path. As the frequency content of a signal increases, the receiver increases the gain of the signal to offset the increased attenuation. Ideally, after equalization, the frequency characteristic of the path is a flat line for all frequencies; however, equalization may have any desired frequency characteristic.

SUMMARY OF INVENTION

According to one aspect of the present invention, a transmission apparatus comprising a transmitter circuit arranged to transmit a signal having a frequency characteristic where the transmitter circuit comprises a driver circuit and a filter; a replica driver circuit operatively connected to the transmitter circuit arranged to adjust the driver circuit; and a voltage control circuit operatively connected to the transmitter circuit arranged to adjust the filter where adjustments to any one of the driver circuit and the filter adjust the frequency characteristic of the signal.

According to one aspect of the present invention, a method for transmitting data comprising transmitting a signal, having a frequency characteristic; and equalizing the transmitting where the equalizing comprises adjusting a drive strength of the signal, and adjusting a delay of the signal where any one of adjusting the drive strength and adjusting the delay adjusts the frequency characteristic of the signal.

According to one aspect of the present invention, a method for transmitting data comprising transmitting a signal, having a frequency characteristic; and equalizing the transmitting where the equalizing comprises adjusting a drive strength of the signal where the adjusting the drive strength comprises outputting from a buffer a reference voltage potential, comparing the reference voltage potential and a desired reference voltage potential, and adjusting the outputting dependent on the comparing, and adjusting a delay of the signal where the adjusting the delay comprises generating a control voltage to a delay element dependent on a phase difference between a reference clock signal and a delayed reference clock signal, and selecting between a plurality of delay lines using a filter code dependent on an eye pattern of the signal.

According to one aspect of the present invention, a transmission apparatus comprising means for transmitting a signal, having a frequency characteristic; and means equalizing the transmitting where equalizing adjusts the frequency characteristic; and means for adjusting the equalizing dependent on adjusting an eye pattern of the signal.

Other aspects and advantages of the invention will be apparent from the following description and the appended claims.

DETAILED DESCRIPTION

Figure 1:
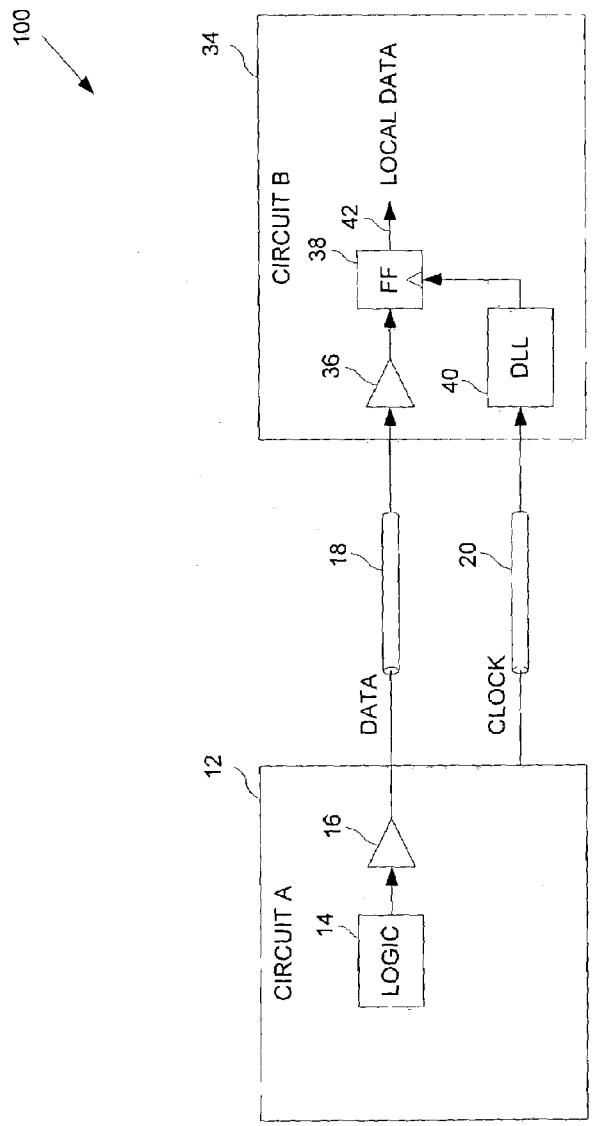
FIG. 1 shows a block diagram of a typical source synchronous communication system.
Figure 2:
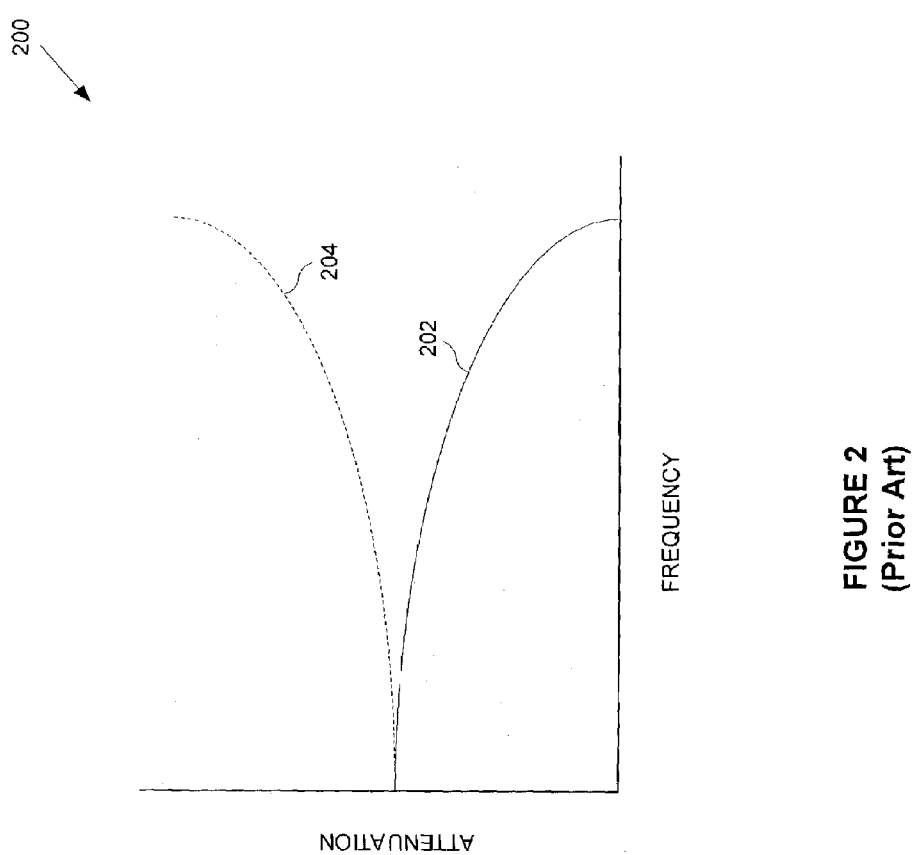
FIG. 2 shows a graph of a typical frequency versus attenuation curve.
Figure 3:
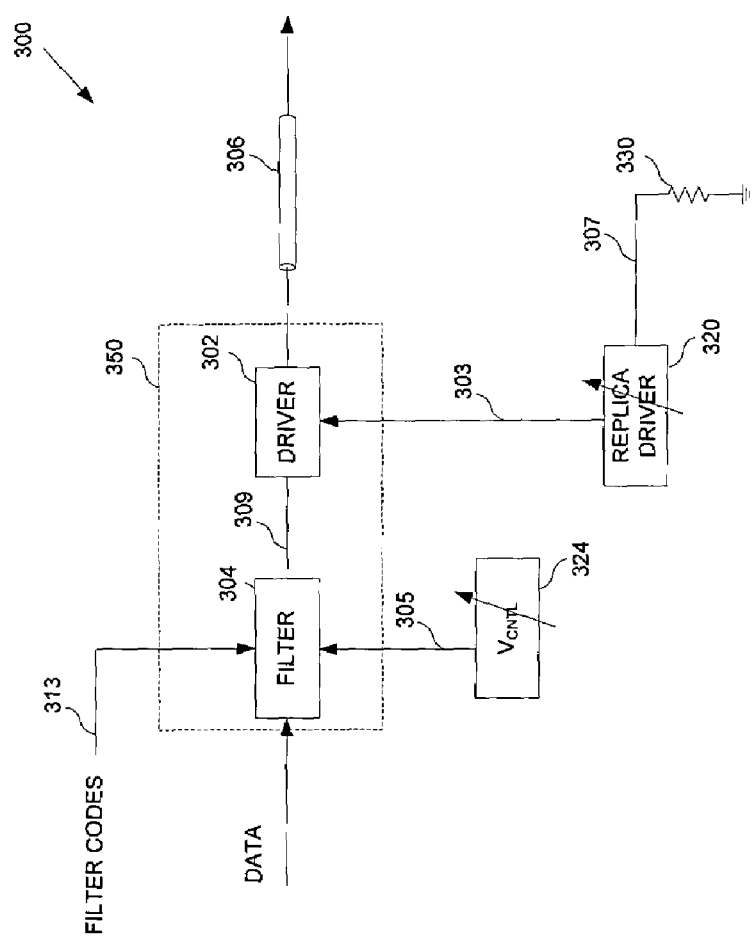
FIG. 3 shows a block diagram of a transmission apparatus in accordance with an embodiment of the present invention.

Embodiments of the present invention relate to an apparatus and method for equalizing a signal using a transmitter circuit. FIG. 3 shows a block diagram of an exemplary transmission apparatus (300) in accordance with an embodiment of the present invention. The transmission apparatus (300) has a transmitter circuit (350), a replica driver (320), and a voltage control circuit (324). The transmitter circuit (350) has a driver circuit (302) and a filter circuit (304). A signal is generated by a logic circuit (not shown) and output by the transmitter circuit (350). The transmitter circuit (350) equalizes an output signal on signal path (306).

The transmitter apparatus (300) equalizes the output signal by adjusting a drive strength of the driver circuit (302), a control voltage potential used by a delay element (not shown) in the filter circuit (304), and filter codes used in the filter circuit (304). The drive strength, control voltage potential, and filter codes have default initialization values.

The replica driver (320) is operatively connected to a precision resistor (330) by line (307). The replica driver (320) determines a desired amount of drive strength using the precision resistor (330) to generate a reference voltage potential. The replica driver (320) adjusts the drive strength of driver circuit (302) using control line (303).

The voltage control circuit (324) determines a desired amount of delay in a delay element (not shown) by adjusting a control voltage potential. The control voltage potential is transmitted on control voltage line (305) to the filter circuit (304). The delay element (not shown) in the filter circuit (304) is responsive to the control voltage potential to set the desired amount of delay.

Filter codes on line (313) adjust the filter circuit (304). The transmitter circuit (350) transmits the output signal on signal path (306) to a receiver circuit (not shown). The receiver circuit determines a size of an eye pattern of a received output signal on signal path (306). The receiver circuit, through a data connection (not shown), transmits the size of the eye pattern to the transmission apparatus (300). Accordingly, the transmission apparatus (300) adjusts the filter codes on line (313) to adjust the size of the eye pattern of the received output signal on signal path (306).

Figure 4:
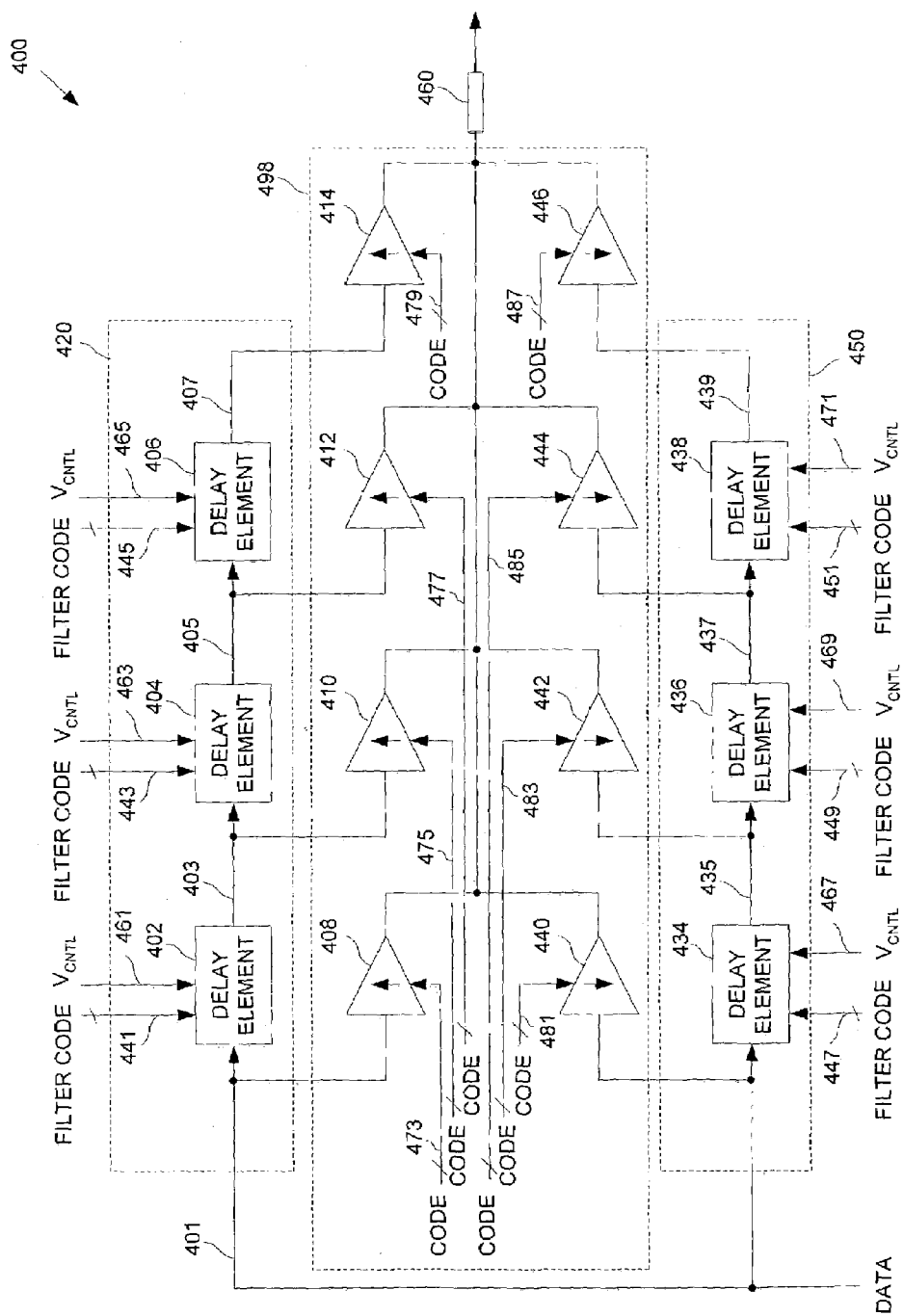
FIG. 4 shows a block diagram of a transmitter circuit in accordance with an embodiment of the present invention.

FIG. 4 shows a block diagram of an exemplary transmitter circuit (400) in accordance with an embodiment of the present invention. The transmitter circuit (400) is representative of the transmitter circuit (350) shown in FIG. 3. An input signal is generated by a logic circuit (not shown) on line (401) and an output signal is output by the transmitter circuit (400) on signal path (460). The signal on line (401) is input to a first delay line (420) and a second delay line (450). The first delay line (420) has delay elements (402, 404, 406), and the second delay line (450) has delay elements (434, 436, 438). The delay lines (420, 450) are arranged to delay the signal on line (401) by a first delay amount on lines (403, 435), by a second delay amount that is greater than or equal to the first delay amount on lines (405, 437), and by a third delay amount that is greater than or equal to the second delay amount on lines (407, 439), respectively. One of ordinary skill in the art will understand that additional or a reduced number of delay elements (402, 404, 406, 434, 436, 438) may be in the delay lines (420, 450).

Each delay element (402, 404, 406, 434, 436, 438) is responsive to a control voltage potential on control voltage lines (461, 463, 465, 467, 469, 471) and filter codes on lines (441, 443, 445, 447, 449, 451), respectively. The filter codes may be a plurality of bits transmitted in series or parallel. The control voltage potential and filter codes determine a delay of each delay element (402, 404, 406, 434, 436, 438).

The signal on line (401) is also input to a pull-up driver circuit (408) and a pull-down driver circuit (440). Delayed copies of the signal on line (401) are generated from the first delay line (420) on lines (403, 405, 407) and from the second delay line (450) on lines (435, 437, 439). The delayed copies of the signal on line (401) on lines (403, 405, 407) are input to pull-up driver circuits (410, 412, 414), respectively. The delayed copies of the signal on line (401) on lines (435, 437, 439) are input to pull-down driver circuits (442, 444, 446), respectively. The pull-up driver circuits (408, 410, 412, 414) and pull-down driver circuits (440, 442, 444, 446) drive the output signal on signal path (460).

The pull-up driver circuits (408, 410, 412, 414) and pull-down driver circuits (440, 442, 444, 446) are responsive to impedance codes (codes) on lines (473, 475, 477, 479, 481, 483, 485, 487), respectively. The impedance codes determine the drive strength of the pull-up driver circuits (408, 410, 412, 414) and pull-down driver circuits (440, 442, 444, 446), respectively. The impedance codes may be a plurality of bits transmitted in series or parallel. One of ordinary skill in the art will understand that the pull-up driver circuits (408, 410, 412, 414) and pull-down driver circuits (440, 442, 444, 446) are variable drive strength driver circuits. Accordingly, driver circuits that have both a pull-up and pull-down characteristic may be substituted for one or more of the pull-up driver circuits (408, 410, 412, 414) and pull-down driver circuits (440, 442, 444, 446).

The transmitter circuit (400) is arranged to drive the output signal on signal path (460) in response to the input signal on line (401). By adjusting the drive strength of pull-up driver circuits (408, 410, 412, 414) and pull-down driver circuits (440, 442, 444, 446) and the delay of delay elements (402, 404, 406, 434, 436, 438), a frequency characteristic of the output signal may be equalized.

In general, a finite impulse response (FIR) filter may be represented with the following equation:

$$y_n = a_0 x_n + a_1 x_{n-1} + \ldots + a_z x_{n-z}, \tag{1}$$

where $y_n$ is the output, $x_n$ is the input at time step n, $x_{n-1}$ is the input at time step n−1, $x_{n-z}$ is the input at time step n−z, and the constants $a_0$, $a_1$, and $a_z$ are filter coefficients. The value and number of the filter coefficients determine the filtering effect. In an embodiment of the present invention, the delay elements (402, 404, 406, 434, 436, 438) determine the time steps and the drive strength of the driver circuits (408, 410, 412, 414, 440, 442, 444, 446) determine the filter coefficients. One of ordinary skill in the art will understand that other arrangements to implement equation (1) may be used.

Figure 5:
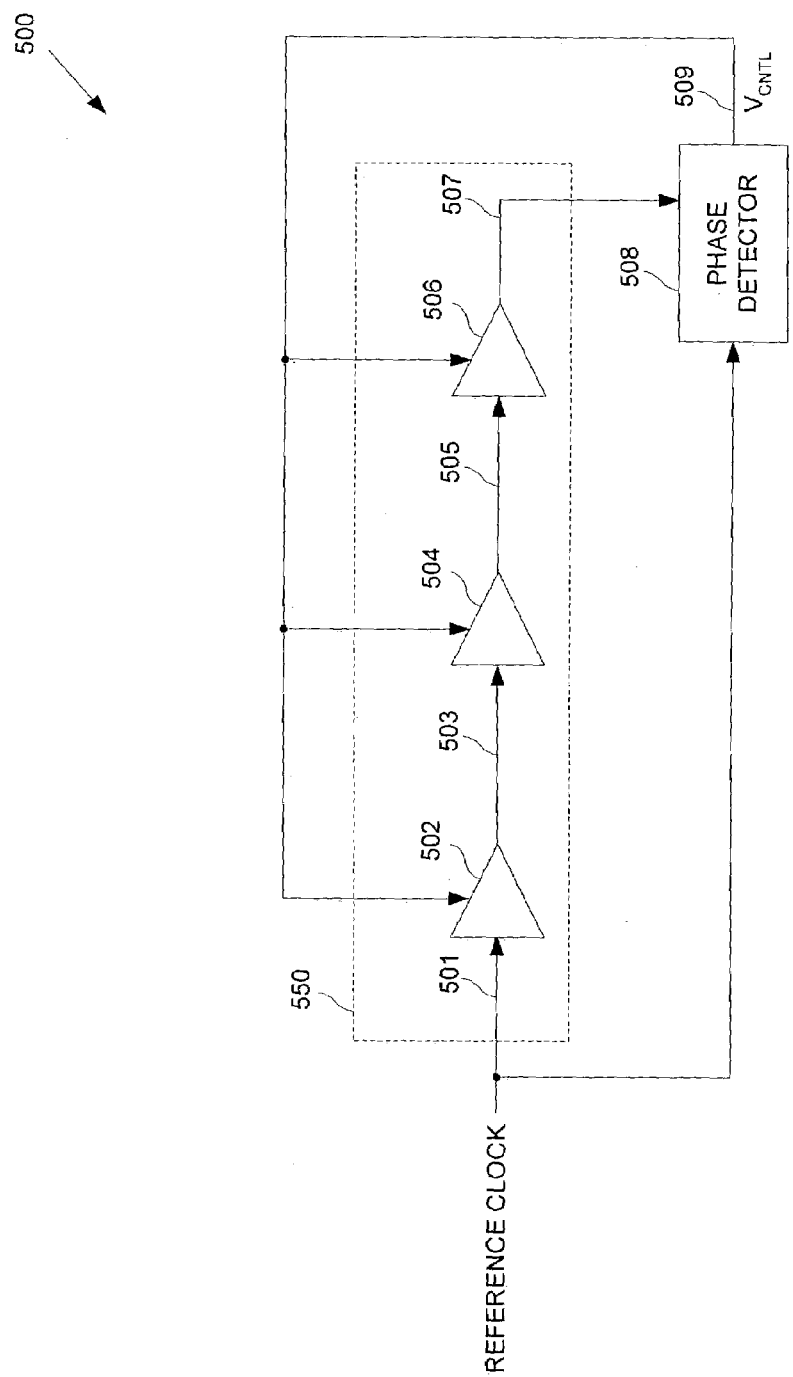
FIG. 5 shows a block diagram of a voltage control circuit in accordance with an embodiment of the present invention.

FIG. 5 shows a block diagram of an exemplary voltage control circuit (500) in accordance with an embodiment of the present invention. A reference clock signal is input on line (501) to a delay line (550) and to a phase detector circuit (508). The delay line (550) includes delay devices (502, 504, 506). The delay line (550) is arranged to delay the reference clock signal on line (501) by a first delay amount on line (503), by a second delay amount that is greater than or equal to the first delay amount on line (505), and by a third delay amount that is greater than or equal to the second delay amount on line (507). One of ordinary skill in the art will understand that additional or a reduced number of delay devices (502, 504, 506) may be in the delay line (550).

The amount of delay produced by the delay devices (502, 504, 506) is determined by a control voltage potential on control voltage line (509). The phase detector circuit (508) receives the reference clock signal on line (501) and a delayed copy of the reference clock signal on line (507). The phase detector circuit (508) is arranged to adjust the control voltage potential on control voltage line (509) until a desired amount of delay or phase difference between the reference clock signal on line (501) and the delayed copy of the reference clock signal on line (507) is achieved. When the desired phase difference is achieved, the control voltage potential may be used to generate a desired delay in other delay elements.

For example, in FIG. 4, the control voltage lines (461, 463, 465, 467, 469, 471) may be coupled to the control voltage potential on control voltage line (509) generated by the voltage control circuit (500) in FIG. 5. The control voltage potential on control voltage line (509) is calibrated such that delay devices (502, 504, 506) provide a unit delay. In other words, each delay device (502, 504, 506) provides an amount of delay, or unit delay, that combined forms the desired amount of delay between the reference clock signal on line (501) and the delayed copy of the reference clock signal on line (507). Accordingly, the delay elements (402, 404, 406, 434, 436, 438) in FIG. 4 may have a known unit delay as a reference.

Figure 6:
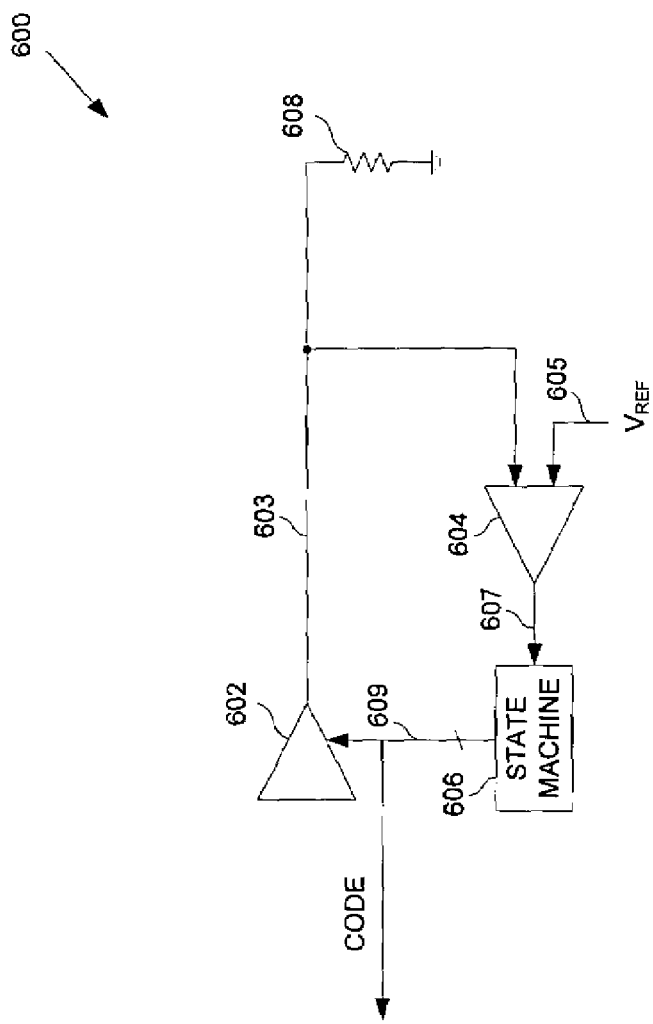
FIG. 6 shows a schematic diagram of a replica driver in accordance with an embodiment of the present invention.

FIG. 6 shows a schematic diagram of an exemplary replica driver (600) in accordance with an embodiment of the present invention. The replica driver (600) is arranged to provide a code that represents a known drive strength by a buffer (602). Accordingly, buffer (602) drives a precision resistor (608) using line (603). A resulting reference voltage potential on line (603) occurs. A comparator (604) compares the reference voltage potential on line (603) to a desired reference voltage potential on line (605). The comparator (604) indicates a difference between the reference voltage potential on line (603) and a desired reference voltage potential on line (605).

An output signal on line (607) of the comparator (604) is received by a state machine (606). Dependent on the output signal on line (607), the state machine (606) adjusts the buffer (602) to produce the desired reference voltage potential occurs on line (603). The state machine (606) may use a code transmitted on line (609) to adjust the buffer (602). The code on line (609) may be a plurality of bits transmitted in series or parallel.

One of ordinary skill in the art will understand that the buffer (602) may be operated in a steady state mode to produce the desired reference voltage potential on line (603). The buffer (602) may be also be continuously switched to produce the desired reference voltage potential on line (603). Furthermore, the code transmitted on line (609), or a code generated as a result of the code transmitted on line (609), may be used to determine the impedance codes on lines (473, 475, 477, 479, 481, 483, 485, 487) in FIG. 4. The code transmitted on line (609) provides a reference drive strength for a buffer. The drive strength of buffer (602) may have a known relationship to the drive strength of driver circuits (408, 410, 412, 414, 440, 442, 444, 446) shown in FIG. 4.

Figure 7:
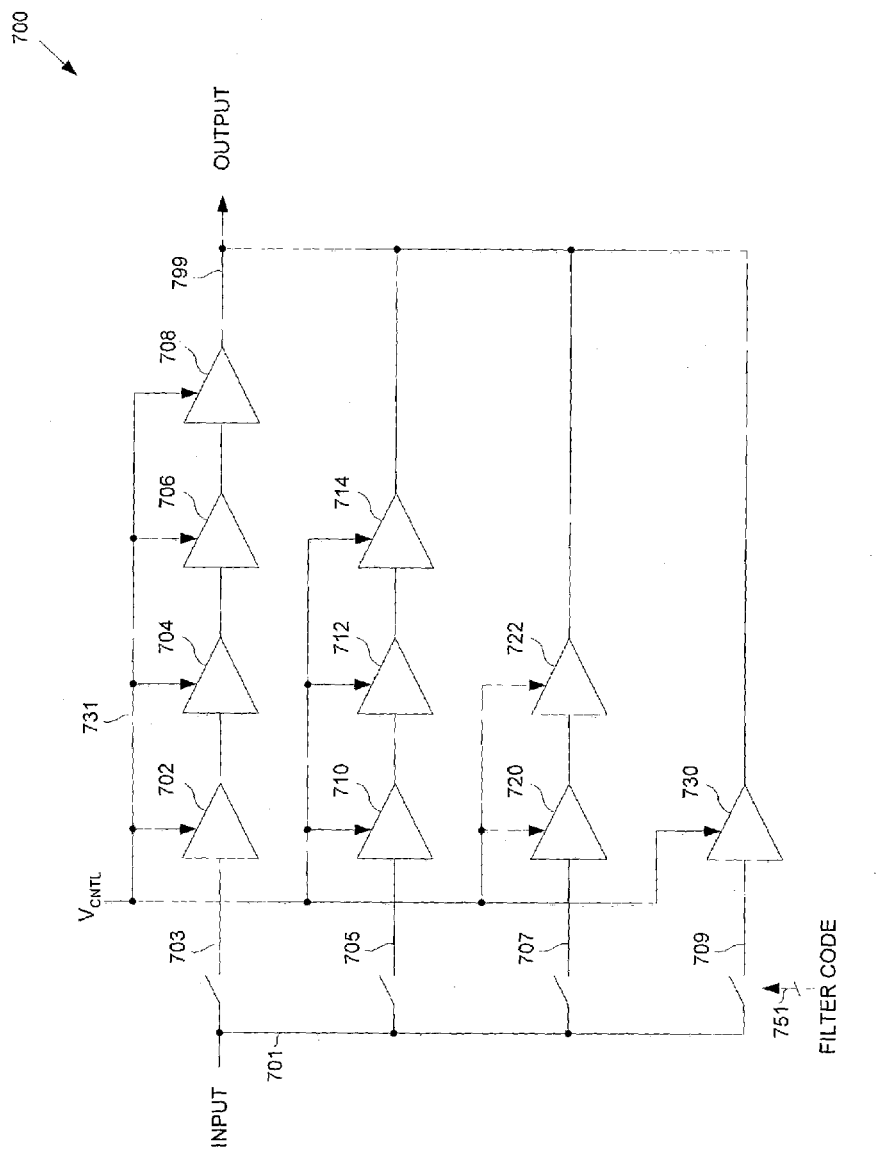
FIG. 7 shows a schematic diagram of a delay element in accordance with an embodiment of the present invention.

FIG. 7 shows a schematic diagram of an exemplary delay element (700) in accordance with an embodiment of the present invention. The delay element (700) may be used as the delay elements (402, 404, 406, 434, 436, 438) shown in FIG. 4. The delay element (700) includes several delay lines, each delay line including a different number of delay devices. A first delay line includes delay devices (702, 704, 706, 708). A second delay line includes delay devices (710, 712, 714). A third delay line includes delay devices (720, 722). A fourth delay line includes delay device (730).

Each delay device (702, 704, 706, 708, 710, 712, 714, 720, 722, 730) has an amount of delay determined by a control voltage potential on control voltage line (731). The control voltage potential may be determined, for example, by the voltage control circuit (500) in FIG. 5. Accordingly, each delay device (702, 704, 706, 708, 710, 712, 714, 720, 722, 730) provides a unit delay. Because each delay line in the delay element (700) has a different number of delay devices, a number of unit delays may be selected. Accordingly, a filter code on line (751) selects one of the delay lines in the delay element (700) to be connected to the input signal on line (701). The filter code on line (751) may be a plurality of bits transmitted in series or parallel.

The input signal on line (701), dependent on the filter code on line (751), will connect to one of the lines (703, 705, 707, 709). Dependent on which line (703, 705, 707, 709) the input signal on line (701) connects, a different number of unit delays will delay the input signal. The delayed input signal is output on line (799).

Figure 8:
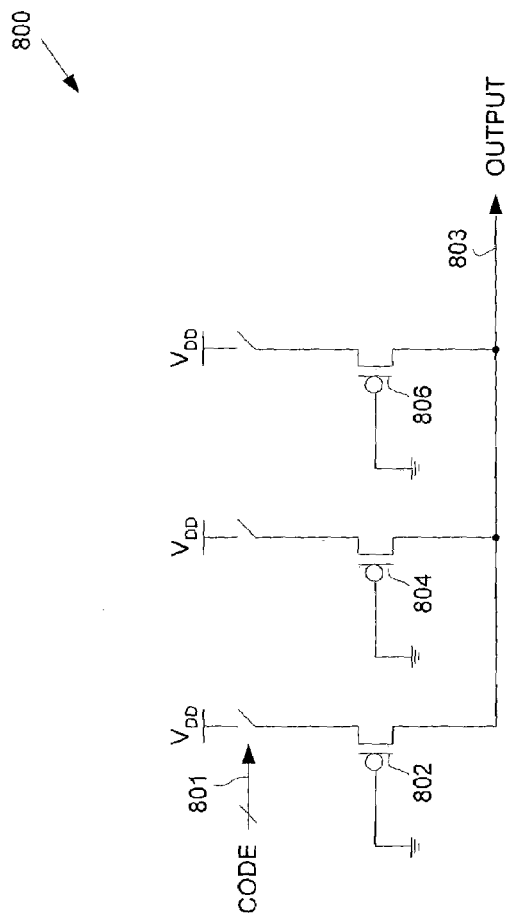
FIG. 8 shows a schematic diagram of a pull-up driver circuit in accordance with an embodiment of the present invention.

FIG. 8 shows a schematic diagram of an exemplary pull-up driver circuit (800) in accordance with an embodiment of the present invention. The pull-up driver circuit (800) includes a plurality of pull-up devices (802, 804, 806). According to one or more embodiments of the present invention, the pull-up devices (802, 804, 806) may each have a different drive strength. The pull-up devices (802, 804, 806) tend to pull a voltage potential on line (803) toward a power supply $V_{DD}$ when connected to the power supply $V_{DD}$. An impedance code (801) determines which of the pull-up devices (802, 804, 806) are connected to the power supply $V_{DD}$. The impedance code (801) may be a plurality of bits transmitted in series or parallel.

The pull-up driver circuit (800) may be representative of the pull-up driver circuits (408, 410, 412, 414) shown in FIG. 4. Dependent on which pull-up devices (802, 804, 806) are connected to the power supply $V_{DD}$, the driver strength of the pull-up driver circuit (800) may be adjusted.

Figure 9:
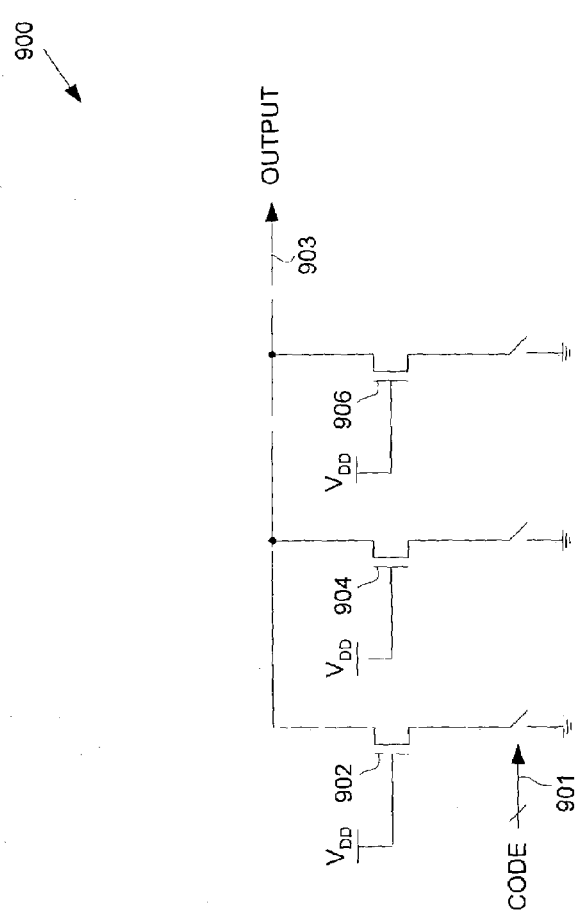
FIG. 9 shows a schematic diagram of a pull-down driver circuit in accordance with an embodiment of the present invention.

FIG. 9 shows a schematic diagram of an exemplary pull-down driver circuit (900) in accordance with an embodiment of the present invention. The pull-down driver circuit (900) includes a plurality of pull-down devices (902, 904, 906). According to one or more embodiments of the present invention, the pull-down devices (902, 904, 906) may each have a different drive strength. The pull-down devices (902, 904, 906) tend to pull a voltage potential on line (903) toward a power supply $V_{SS}$ when connected to the power supply $V_{SS}$. An impedance code (901) determines which of the pull-down devices (902, 904, 906) are connected to the power supply $V_{SS}$. The impedance code (901) may be a plurality of bits transmitted in series or parallel.

The pull-down driver circuit (900) may be representative of the pull-down driver circuits (440, 442, 444, 446) shown in FIG. 4. Dependent on which pull-down devices (902, 904, 906) are connected to the power supply $V_{SS}$, the driver strength of the pull-down driver circuit (900) may be adjusted.

Figure 10:
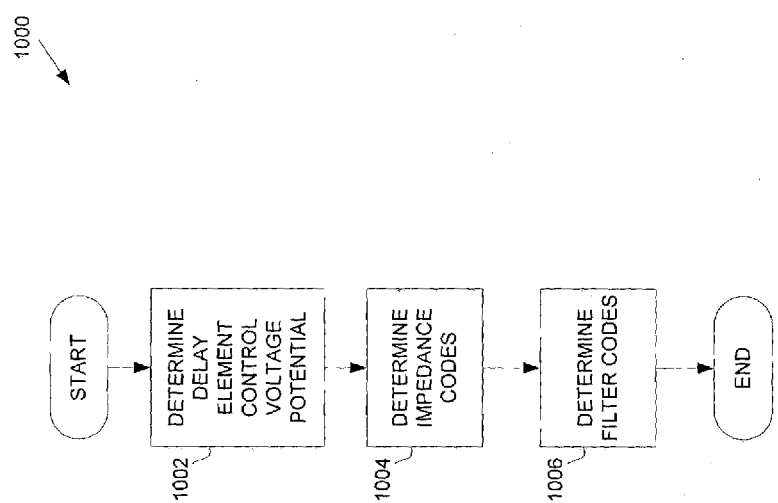
FIG. 10 shows a flow diagram of a transmission apparatus adjustment in accordance with an embodiment of the present invention.

FIG. 10 shows a flow diagram of an exemplary transmission apparatus adjustment (1000) in accordance with an embodiment of the present invention. A control voltage potential is determined (step 1002). The control voltage potential adjusts an amount of delay in a delay element, for example, delay element (402, 404, 406, 434, 436, 438) shown in FIG. 4. The control voltage potential is adjusted until a desired amount of delay is produced by a voltage control circuit, for example, the voltage control circuit (324)

shown in FIG. 3. After the desired amount of delay is produced in the voltage control circuit, the control voltage potential provides a reference such that a desired unit delay or integer multiple of a desired unit delay may be produced by the delay element.

A desired amount of drive strength from the transmission apparatus, for example transmission apparatus (300) shown in FIG. 3, is determined by impedance codes (step 1004). A replica driver, e.g., a replica driver (320) shown in FIG. 3, determines a desired amount of drive strength. The replica driver adjusts the drive strength until a desired drive strength is achieved. A code responsible for the desired drive strength is propagated to a transmitter circuit, e.g., transmitter circuit (350) shown in FIG. 3. The transmitter circuit adjusts the drive strength of drivers in the transmitter circuit, e.g., pull-up drivers (408, 410, 412, 414) and pull-down drivers (440, 442, 444, 446) shown in FIG. 4, using impedance codes derived from the code generated by the replica driver.

The transmitter apparatus equalizes an output signal by adjusting the control voltage potential (step 1002), the drive strength using impedance codes (step 1004), and filter codes (step 1006). The transmitter circuit in a transmitter apparatus transmits the output signal to a receiver circuit. The receiver circuit determines a size of an eye pattern of a received output signal. The receiver circuit transmits the size of the eye pattern to the transmission apparatus. Accordingly, the transmission apparatus adjusts the filter codes (step 1006) to enlarge the size of the eye pattern of the received output signal. The adjusting the filter codes (step 1006) may occur when power is applied to the transmitter apparatus. Further, the adjusting the filter codes (step 1006) may occur periodically after the transmitter circuit is first adjusted.

Figure 11:
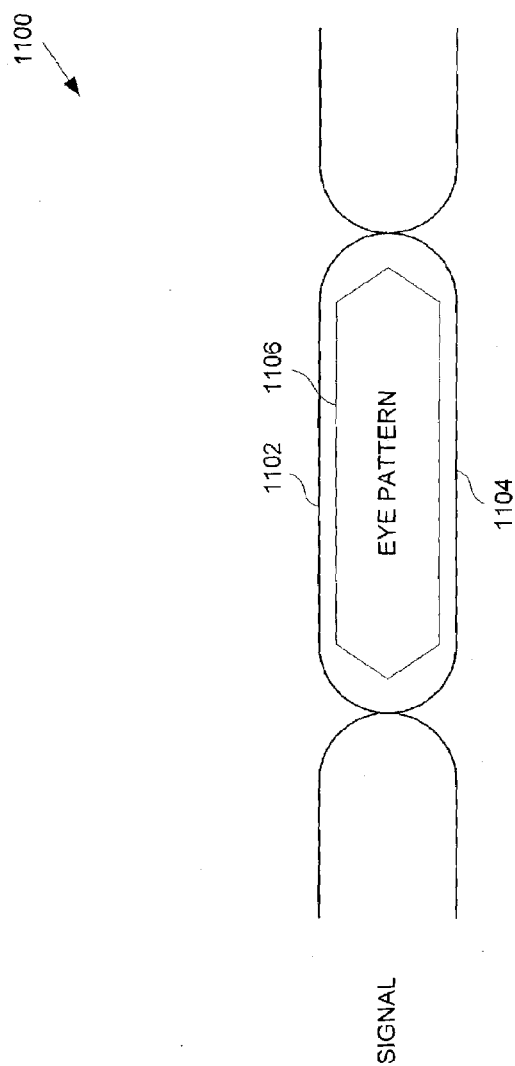
FIG. 11 shows a graph of an eye pattern of a signal in accordance with an embodiment of the present invention.

FIG. 11 shows a graph of an exemplary eye pattern of a signal (1100) in accordance with an embodiment of the present invention. A signal received by a receiving circuit (not shown) may at times have a high voltage potential (1102) during a single clock cycle. At other times, the signal received at the receiving circuit may have a low voltage potential (1104) during a single clock cycle. Accordingly, a superposition of the high voltage potential signal and the low voltage potential signal form an eye pattern (1106). The signal, having been equalized, maximizes the size of the eye pattern (1106).

Advantages of the present invention may include one or more of the following. In one or more embodiments, because a transmitting apparatus is used, an output signal may be equalized. Accordingly, a bit error rate may be reduced.

In one or more embodiments, a signal received by a receiving circuit is used to determine the equalization. Accordingly, frequency characteristics of a path and the receiver circuit may be equalized.

In one or more embodiments, a unit delay, drive strength of a driver, and filter codes are adjusted to obtain an equalization. Accordingly, the unit delay, the drive strength of the driver, and the filter codes variables may be adjusted independently. By adjusting the unit delay, the drive strength of the driver, and the filter codes variables, the equalization may improve the quality of a received signal.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A transmission apparatus, comprising:
   a transmitter circuit arranged to transmit a signal having a frequency characteristic, wherein the transmitter circuit comprises a driver circuit and a filter;
   a replica driver circuit operatively connected to the transmitter circuit arranged to adjust the driver circuit, wherein the replica driver circuit further comprises:
      a buffer arranged to output a reference voltage potential,
      a comparator arranged to generate an output signal dependent on a difference between the reference voltage potential and a desired reference voltage potential, and
      a state machine arranged to adjust the buffer dependent on the output from the comparator, and
   a voltage control circuit operatively connected to the transmitter circuit arranged to adjust the filter, wherein adjustments to any one of the driver circuit and the filter adjust the frequency characteristic of the signal.

2. The transmission apparatus of claim 1, further comprising:
   a precision resistor operatively connected to the buffer.

3. The transmission apparatus of claim 1, the filter comprising at least one delay element operatively connected to the voltage control circuit, wherein the voltage control circuit is arranged to adjust the at least one delay element.

4. The transmission apparatus of claim 1, the filter comprising at least one delay element arranged to receive a filter code.

5. The transmission apparatus of claim 4, wherein the filter code comprises a finite impulse response filter code.

6. The transmission apparatus of claim 4, wherein the filter code is dependent on an eye pattern of the signal.

7. The transmission apparatus of claim 4, the at least one delay element comprising:
   a first delay line arranged to delay an input dependent on a control voltage signal; and
   a second delay line arranged to delay the input dependent on the control voltage signal, wherein a delay of the first delay line and a delay of the second delay line are each independent on the filter code.

8. The transmission apparatus of claim 1, wherein the driver circuit comprises a pull-up driver circuit.

9. The transmission apparatus of claim 1, wherein the driver circuit comprises a pull-down driver circuit.

10. The transmission apparatus of claim 1, the voltage control circuit comprising:
    a delay line arranged to generate a delayed reference clock signal dependent on a reference clock signal; and
    a phase detector arranged to generate a control voltage signal dependent on a phase difference between the reference clock signal and the delayed reference clock signal, wherein the control voltage signal adjusts the delay line.

11. A method for transmitting data, comprising:
    transmitting a signal having a frequency characteristic; and
    equalizing the transmitting, wherein the equalizing comprises:
       adjusting a drive strength of the signal, wherein adjusting drive strength comprises:
          outputting from a buffer a reference voltage potential, comparing the reference voltage potential and a desired reference voltage potential, and adjusting the outputting dependent on the comparing, and adjusting a delay of the signal, wherein the adjusting the delay comprises:

generating a control voltage for a delay element dependent on a phase difference between a reference clock signal and a delayed reference clock signal, and selecting between a plurality of delay lines using a filter code dependent on an eye pattern of the signal.

12. The method of claim 11, wherein adjusting the drive strength of the signal comprises adjusting a pull-up circuit.

13. The method of claim 11, wherein adjusting the drive strength of the signal comprises adjusting a pull-down circuit.

* * * * *

UNITED STATES PATENT AND TRADEMARK OFFICE
CERTIFICATE OF CORRECTION

| | |
|---|---|
| PATENT NO. | : 7,190,719 B2 |
| APPLICATION NO. | : 10/338360 |
| DATED | : March 13, 2007 |
| INVENTOR(S) | : Claude R. Gauthier et al. |

It is certified that error appears in the above-identified patent and that said Letters Patent is hereby corrected as shown below:

Delete Claim 2, insert claim 2 as shown

2. The transmission apparatus of claim 1, the replica driver comprising:

a buffer arranged to output a reference voltage potential;

a comparator arranged to generate an output signal dependant on a difference between the reference voltage potential and a desired reference voltage potential; and a state machine arranged to adjust the buffer dependent on the output from the comparator.

Signed and Sealed this

Nineteenth Day of June, 2007

JON W. DUDAS
*Director of the United States Patent and Trademark Office*